US008041755B2

(12) United States Patent
Tam

(10) Patent No.: US 8,041,755 B2
(45) Date of Patent: Oct. 18, 2011

(54) FAST STATIC ROTATOR/SHIFTER WITH NON TWO'S COMPLEMENTED DECODE AND FAST MASK GENERATION

(75) Inventor: Honkai Tam, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1121 days.

(21) Appl. No.: 11/760,539

(22) Filed: Jun. 8, 2007

(65) Prior Publication Data

US 2008/0307204 A1 Dec. 11, 2008

(51) Int. Cl.
*G06F 7/00* (2006.01)
*G06F 15/00* (2006.01)

(52) U.S. Cl. ........................................ 708/209

(58) Field of Classification Search ........... 708/200–209
See application file for complete search history.

(56) References Cited

U.S. PATENT DOCUMENTS

| 4,839,839 | A | * | 6/1989 | Tokumaru et al. | ............ 708/209 |
| 5,526,296 | A | * | 6/1996 | Nakahara et al. | ............ 708/209 |
| 5,745,393 | A | * | 4/1998 | Wong | ............................ 708/209 |
| 5,844,827 | A | * | 12/1998 | Wong | ............................ 708/209 |
| 5,896,305 | A | * | 4/1999 | Bosshart et al. | ............ 708/209 |
| 5,926,070 | A | | 7/1999 | Barron et al. | |
| 5,935,239 | A | | 8/1999 | Narayan | |
| 5,995,747 | A | | 11/1999 | Guttag et al. | |
| 6,654,774 | B1 | * | 11/2003 | Dhablania et al. | ............ 708/209 |
| 6,738,792 | B1 | | 5/2004 | Muthusamy | |
| 7,409,415 | B2 | * | 8/2008 | Bosshart | ........................ 708/209 |
| 2002/0053015 | A1 | * | 5/2002 | Tan et al. | ........................ 708/209 |
| 2003/0131030 | A1 | * | 7/2003 | Sebot et al. | .................... 708/209 |

OTHER PUBLICATIONS

Mark Hayter, "Zen and the Art of SOC Design," Microprocessor Summit 2006, Session MPS-960 High End Processors, P.A. Semi, Inc., 14 pages.
James B. Keller, "The PWRficient Processor Family," PA Semi, Oct. 2005, 31 pages.

* cited by examiner

*Primary Examiner* — Lewis Bullock, Jr.
*Assistant Examiner* — Kevin G Hughes
(74) *Attorney, Agent, or Firm* — Lawrence J. Merkel; Meyertons, Hood, Kivlin, Kowert & Goetzel, P.C.

(57) ABSTRACT

In one embodiment, a rotator, a mask generator, and circuitry configured to mask the rotated operand output by the rotator with the output mask generated by the mask generator perform a shift operation. The rotator is configured to rotate the input operand by the shift count. The mask generator is configured to generate an output mask by decoding a most significant bit (MSB) field of the shift count to generate a first mask, decoding a least significant bit (LSB) field of the shift count to generate a second mask, logically ANDing the bits of the second mask with the corresponding bit of the first mask and logically ORing the result with an adjacent bit of the first mask that is selected responsive to the shift direction.

19 Claims, 8 Drawing Sheets

| Dir. (0=R, 1=L) | In[0:2] | Out[0:7] |
|---|---|---|
| 0 | 000 | 1111 1111 |
| 0 | 001 | 0111 1111 |
| 0 | 010 | 0011 1111 |
| 0 | 011 | 0001 1111 |
| 0 | 100 | 0000 1111 |
| 0 | 101 | 0000 0111 |
| 0 | 110 | 0000 0011 |
| 0 | 111 | 0000 0001 |
| 1 | 000 | 1111 1111 |
| 1 | 001 | 1111 1110 |
| 1 | 010 | 1111 1100 |
| 1 | 011 | 1111 1000 |
| 1 | 100 | 1111 0000 |
| 1 | 101 | 1110 0000 |
| 1 | 110 | 1100 0000 |
| 1 | 111 | 1000 0000 |

Fig. 4

| Right Cnt | Left Cnt |
|---|---|
| 000 000 | 000 000 |
| 000 001 | 111 111 |
| 000 010 | 111 110 |
| 000 011 | 111 101 |
| 000 100 | 111 100 |
| 000 101 | 111 011 |
| 000 110 | 111 010 |
| 000 111 | 111 001 |
| 001 000 | 001 000 |
| 001 001 | 110 111 |
| 001 010 | 110 110 |
| 001 011 | 110 101 |
| 001 100 | 110 100 |
| 001 101 | 110 011 |
| 001 110 | 110 010 |
| 001 111 | 110 001 |
| 010 000 | 010 000 |

FAST STATIC ROTATOR/SHIFTER WITH NON TWO'S COMPLEMENTED DECODE AND FAST MASK GENERATION

BACKGROUND

1. Field of the Invention

This invention is related to the field of integrated circuits and, more particularly, to performing shifts in integrated circuits.

2. Description of the Related Art

Mask generation is one task that is often performed in integrated circuits such as processors. Generally, masks can be used to zero data that is not desired by bitwise ANDing the data with the mask. Data bits for which the corresponding mask bit is clear are cleared, and data bits for which the corresponding mask bit is set are unchanged. Similarly, a mask can be logically ORed with data to set bits for which the corresponding mask bit is set, and bits for which the corresponding mask bit is clear are not changed. An example of mask use is merging load data from multiple sources. Data from a given source that is not used in the merge can be masked off. A mask can be applied to the output of a rotator to create the effect of a shift (zeroing bits that are not part of the shift result). A mask can be used to zero certain address bits (e.g. the offset within a cache line, to fetch a cache line from memory).

Many masks have one transition from binary one to binary zero (or vice versa). That is, the mask has a set of binary ones on one side of the transition point and a set of binary zeros on the other side of the transition point. Typical mask generators decode a pointer that identifies the transition point, generating a vector of bits having a set bit representing the transition point, and clear bits in each other position. The mask bit for a given bit position can then be generated by logically ORing all the bits that are less significant than the bit position (or more significant that the bit position, depending on the type of mask being generated). However, such a mechanism uses wide OR gates, which are slow in static logic circuitry (and sometimes high in power consumption). To speed the generation, wide dynamic OR logic circuitry can be used, but the power consumption of the dynamic logic circuitry is even higher. A low power, high speed mask generator is desired.

Additionally, rotations and shifts are commonly performed in processors, typically in response to instructions. Generally, the rotates and shifts can be specified to occur in either direction (left or right). Some processors implement a rotator that rotates in one direction (say, left), and two's complement the rotate count for a rotate in the other direction (e.g. right) to produce the correct result. A shift can be performed using the rotator and a mask to mask off bits that are eliminated via the shift operation.

SUMMARY

In one embodiment, an apparatus configured to perform a shift operation on an input operand is contemplated. A size of the shift operation is specified by a shift count and a direction of the shift operation is specified by a shift direction. The apparatus comprises a rotator, a mask generator, and circuitry configured to mask the rotated operand output by the rotator with the output mask generated by the mask generator. Coupled to receive the input operand and the shift count, the rotator is configured to rotate the input operand by the shift count, outputting the rotated operand. Coupled to receive the shift count and the shift direction, the mask generator is configured to generate an output mask. The mask generator is configured to decode a most significant bit (MSB) field of the shift count to generate a first mask, and wherein the mask generator is configured to decode a least significant bit (LSB) field of the shift count to generate a second mask. Each bit of the first mask corresponds to a different section of the output mask, and the mask generator is configured to generate each section of the output mask by logically ANDing the bits of the second mask with the corresponding bit of the first mask and logically ORing the result with an adjacent bit of the first mask, wherein the mask generator is configured to select the adjacent bit responsive to the shift direction.

In an embodiment, the mask generator comprises a first decoder coupled to receive MSB field of the shift count and the shift direction and configured to generate the first mask, a second decoder coupled to receive a least significant bit (LSB) field of the shift count and the shift direction and configured to generate the second mask, and a final mask generator coupled to the first decoder and the second decoder and to receive the shift direction. The final mask generator is configured to generate each section of the output mask by logically ANDing the bits of the second mask with the corresponding bit of the first mask and logically ORing the result with an adjacent bit of the first mask, wherein the final mask generator is configured to select the adjacent bit responsive to the shift direction.

In one embodiment, a method comprises receiving a shift count and a shift direction of a shift operation; decoding a most significant bit (MSB) field of the shift count to generate a first mask, wherein each bit of the first mask corresponds to a different section of an output mask; decoding a least significant bit (LSB) field of the shift count to generate a second mask; and generating each section of the output mask by logically ANDing the bits of the second mask with the corresponding bit of the first mask and logically ORing the result with an adjacent bit of the first mask, the adjacent bit selected responsive to the shift direction.

BRIEF DESCRIPTION OF THE DRAWINGS

The following detailed description makes reference to the accompanying drawings, which are now briefly described.

FIG. 4 is one embodiment of a truth table for a decoder shown in FIG. 2.

FIG. 7 is a table illustrating a right rotate/shift count and the corresponding left rotate/shift count.

Figure 1:
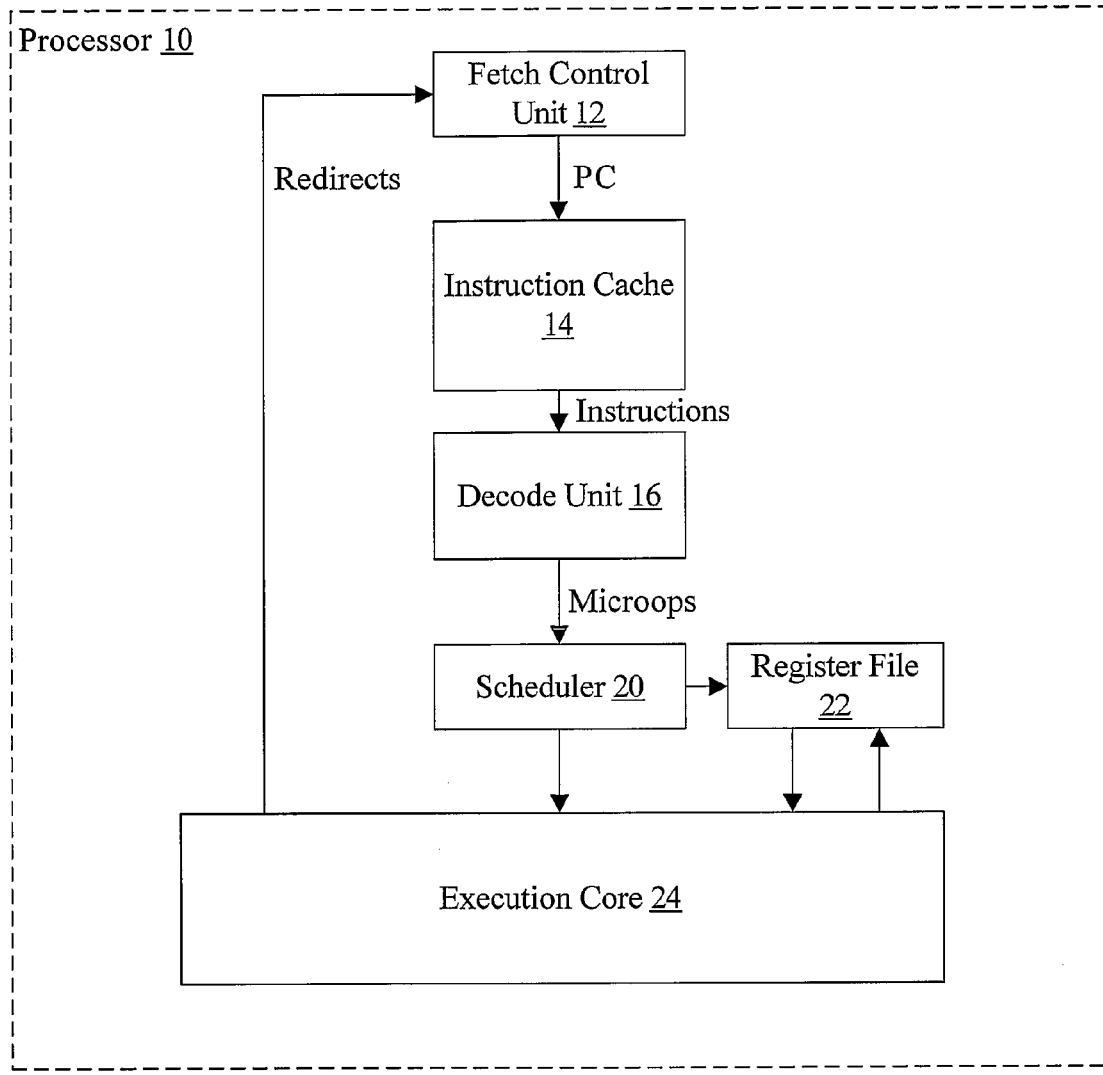
FIG. 1 is a block diagram of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a processor 10 is shown. In the illustrated embodiment, the processor 10 includes a fetch control unit 12, an instruction cache 14, a decode unit 16, a scheduler 20, a register file 22, and an execution core 24. The fetch control unit 12 is coupled to provide a program counter (PC) for fetching from the instruction cache 14, and is coupled to receive a redirect from the execution core 24. The instruction cache 14 is coupled to provide instructions to the decode unit 16, which is coupled to provide microops to the scheduler 20. The scheduler 20 is coupled is coupled to the register file 22, and is coupled to provide microops for execution to the execution core 24. The register file 22 is coupled to provide operands to the execution core 24 and to receive results from the execution core 24. It is noted that the PC of an instruction may be an address that locates the instruction itself in memory. That is, the PC is the address that may be used to fetch the instruction. The PC may be an effective or virtual address that is translated to the physical address actually used to access the memory, or may be a physical address, in various embodiments.

The decode unit 16 may be configured to generate microops for each instruction provided from the instruction cache 14. Generally, the microops may each be an operation that the hardware included in the execution core 24 is capable of executing. Each instruction may translate to one or more microops which, when executed, result in the performance of the operations defined for that instruction according to the instruction set architecture. The decode unit 16 may include any combination of circuitry and/or microcoding in order to generate microops for instructions. For example, relatively simple microop generations (e.g. one or two microops per instruction) may be handled in hardware while more extensive microop generations (e.g. more than three microops for an instruction) may be handled in microcode. The number of microops generated per instruction in hardware versus microcode may vary from embodiment to embodiment. Alternatively, each instruction may map to one microop executed by the processor. Accordingly, an operation (e.g. a shift or rotate operation) may be an operation derived from an instruction or may be a decoded instruction, as desired.

Microops generated by the decode unit 16 may be provided to the scheduler 20, which may store the microops and may schedule the microops for execution in the execution core 24. In some embodiments, the scheduler 20 may also implement register renaming and may map registers specified in the microops to registers included in the register file 22. When a microop is scheduled, the scheduler 20 may read its source operands from the register file 22 and the source operands may be provided to the execution core 24.

Among the microops executed by the execution core may be rotate operations and shift operations. The rotate operations operate on an input operand, rotating it left or right by a rotate count provided as another operand. Shift operands also operate on an input operand, shifting it left or right by a shift count provided as another operand. A rotation involves retaining the bits that are rotated out of the input operand in bits at the other end of the operand. That is, a left rotation retains bits rotated out of the left (most significant) end of the input operand in the bits at the right (least significant) end of the input operand (which were effectively vacated by the bits rotated further left in the operand). Similarly, a right rotation retains bits rotated out of the right (least significant) end of the input operand in the bits at the left (most significant) end of the input operand. On the other hand, a shift operation does not involve retaining the bits that are shifted out of the input operand. Instead, the bits that are vacated at the other end of the operand are filled (e.g. with zeros, in one embodiment, although other embodiments may fill then vacated bits with ones or with a sign bit).

The nomenclature of "right" and "left" for shift/rotate operations may be measured with respect to the most significant and least significant bits of the input operand. For example, a left shift or rotate may move bits toward the most significant bit of the input operand (which is on the left, arithmetically, when humans write numbers). A right shift or rotate may move bits toward the least significant bit of the input operand (which is on the right, arithmetically).

The execution unit 24 may include a rotator and a mask generator to perform shift and rotate operations. The mask generator may be a high speed, static mask generator. That is, the mask generator may be formed from static logic circuitry. Thus, power may be conserved as compared to dynamic logic circuitry often used in high speed mask generators. Furthermore, the rotator may rotate in one direction, but may avoid the two's complement operation on the rotation/shift count. Additional details are provided below.

In addition to execution circuitry for rotate/shift operations, the execution core 24 may comprise other execution circuitry (e.g. one or more integer and/or floating point arithmetic/logic units (ALUs), one or more load/store units, one or more acceleration units (e.g. for vector instructions, cryptographic operations, etc.), etc.

The register file 22 may generally comprise any set of registers usable to store operands and results of microops executed in the processor 10. In some embodiments, the register file 22 may comprise a set of physical registers and the scheduler 20 may map the logical registers to the physical registers. The logical registers may include both architected registers specified by the instruction set architecture implemented by the processor 10 and temporary registers that may be used as destinations of microops for temporary results (and sources of subsequent microops as well). In other embodiments, the register file 22 may comprise an architected register set containing the committed state of the logical registers and a speculative register set containing speculative register state.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.).

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions. For example, up to 4 instructions may be output in one embodiment. Other embodiments may use more or fewer instructions as a maximum.

It is noted that, while the illustrated embodiment uses a scheduler, other embodiments may implement other microarchitectures. For example, a reservation station/reorder buffer microarchitecture may be used. If in-order execution is implemented, other microarchitectures without out of order execution hardware may be used.

Figure 2:
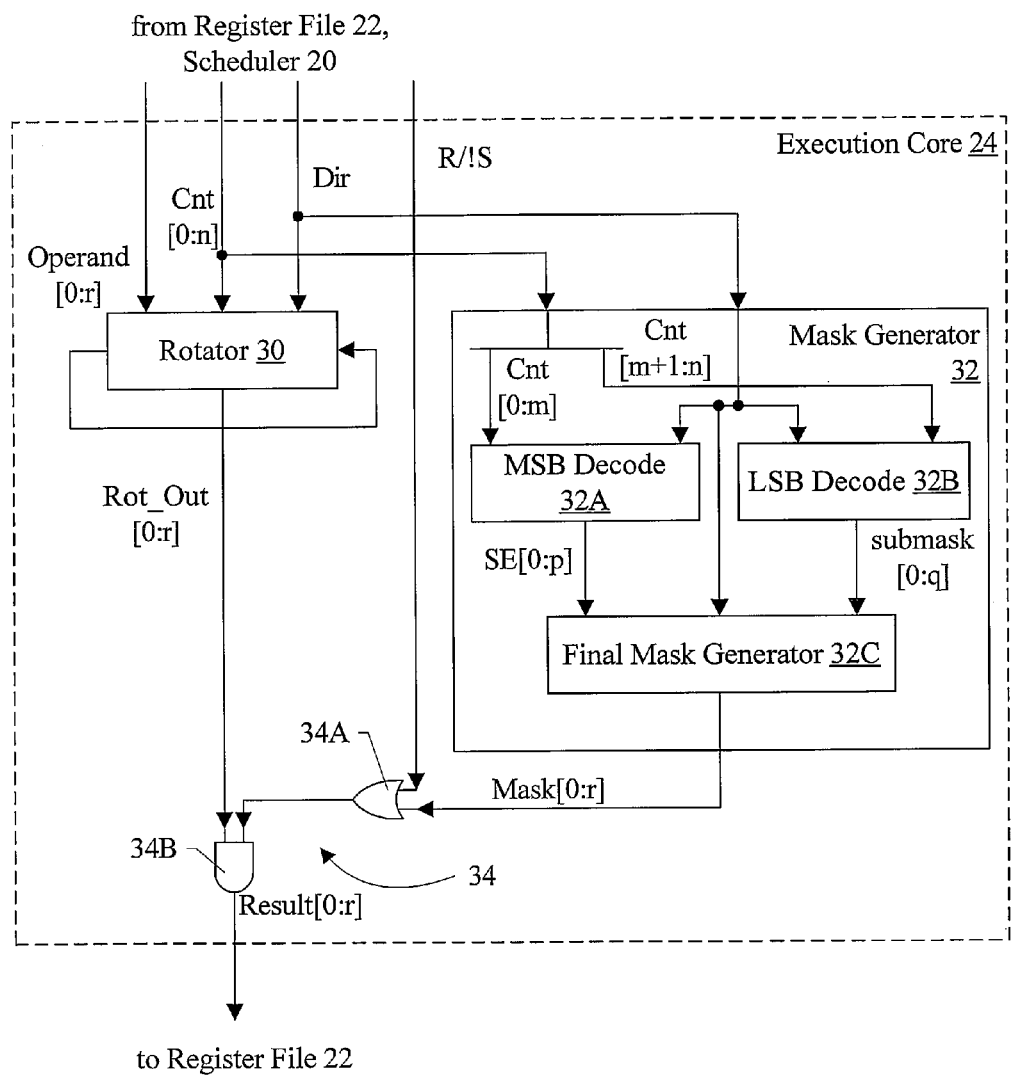
FIG. 2 is a block diagram of one embodiment of an execution core.

Turning now to FIG. 2, a block diagram of one embodiment of a portion of the execution core 24 is shown. In FIG. 2, a rotator 30, a mask generator 32, and circuitry 34 is shown. The rotator 30, mask generator 32, and circuitry 34 may be an execution unit within the execution core 24, or may be part of an execution unit (e.g. an integer execution unit) that includes other hardware such as one or more adders, one or more multipliers, other logic operation circuitry, etc. The execution core 24 may include multiple instances of the rotator 30, the mask generator 32, and circuitry 34 in some embodiments. The rotator 30, mask generator 32, and circuitry 34 may be configured to perform rotate/shift operations. Various bit ranges are shown in FIG. 2 and some other figures. In this description, bit zero is the most significant bit and the bits decrease in significance with increasing bit numbers. Other embodiments may use the opposite bit numbering scheme, where bit 0 is the least significant bit and the bits increase in significance with increasing bit numbers.

The rotator 30 is coupled to receive an input operand (Operand[0:r] in FIG. 2), a count (Cnt[0:n] in FIG. 2), and a direction (Dir in FIG. 2) from the register file 22 and/or scheduler 20. The input operand may be provided from the register file 22, responsive to a register address coded in the instruction from which the rotate/shift operation is derived. The count is a shift/rotate count, and may be supplied from the register file 22 (if the count is provided in a register), or from an immediate field of the instruction (if the count is an immediate operand). The direction may be decoded from the instruction (right or left). In one embodiment, the direction may be a binary one for left and a binary zero for right. Other embodiments may reverse the meaning of one and zero states of the direction.

The rotator 30 is configured to rotate the input operand right or left by the amount specified in the count operand. In one embodiment, the rotator 30 may be configured to rotate in one direction (e.g. left, as shown in FIG. 2) and the count may be modified if the direction is right to result in the desired right rotate. For example, subtracting the count from $2^n$ and left rotating by the result may be the same as right rotating by the count. More specifically, the count may be two's complemented to perform a right rotate/shift. In another embodiment described in more detail below, the two's complement operation may be skipped. Alternatively, the rotator 30 may be configured to rotate in either direction, based on the direction input. The rotator 30 may provided a rotated operand as an output (Rot_Out[0:r]).

The mask generator 32 is coupled to receive the count and the direction, and may generate an output mask (Mask[0:r]) to be applied to the rotated operand to produce a shift result. For a right shift, the mask may comprise binary zeros in the most significant bits, followed by binary ones in the remaining bits. For a left shift, the mask may comprise binary zeros in the least significant bits and binary ones in the most significant bits. In either case, the number of binary zeros may be equal to the shift count. Thus, a shift fills the bit positions that are emptied by the shift with binary zeros, in this embodiment.

If the operation issued to the rotator 30 is actually a rotate (signified, in FIG. 2, by asserting a rotate/not shift (R/!S) signal), then the output mask may be overridden. In FIG. 2, the override may be accomplished by the OR gate 34A (part of the circuitry 34). The OR gate 34A may represent a logical OR of each output mask bit with the R/!S signal. Accordingly, if a rotate is specified the result of the OR is a mask containing all binary ones. Otherwise, if a shift is specified, the R/!S signal is a binary zero and the output mask is not modified. The circuitry also includes an AND gate 34B, which represents a bitwise AND of the mask bits and corresponding rotated operand bits to provide the result (Result[0:r] in FIG. 2). In other embodiments, the output mask of the mask generator 32 may be overridden in other fashions (e.g. the mask generator 32 may incorporate the override and may receive the R/!S signal). Alternatively, the circuitry shown in FIG. 2 may be used only for shifts, and no override is required.

The mask generator 32 is shown in greater detail in FIG. 2, for one embodiment. In the illustrated embodiment, the mask generator includes a most significant bits (MSB) decoder 32A, a least significant bit (LSB) decoder 32B, and a final mask generator 32C. The decoders 32A-32B and final mask generator 32C are coupled to receive the direction (Dir). The MSB decoder 32A is coupled to receive one or more MSBs of the shift count (Cnt[0:m], were m is an integer greater than or equal to zero) and the LSB decoder 32B is coupled to receive one or more LSBs of the shift count (Cnt[m+1, n]). The MSBs may also be referred to as an MSB field of the shift count, and the LSBs may be referred to as an LSB field of the shift count. The number of MSBs and LSBs may vary in various embodiments. In one embodiment, the number of MSBs and LSBs may be about equal. That is, m may be about one half of n. If the total number of count bits is even, the number of MSBs may be equal to the number of LSBs. If the total number is odd, the number of MSBs may be one less or one greater than the number of LSBs. Other embodiments may implement any division of the bits.

The MSB and LSB decoders 32A-32B may decode their input values and generate masks based on the direction of the shift/rotate. If the input value is zero, the mask may be all ones. If the input value is not zero, the mask output by the decoder 32A-32B may include a number of binary zeros equal to the input value. The zeros may comprise the MSBs of the decoder output, for a right shift, or the LSBs of the decoder output, for a left shift. The remaining bits may be binary ones.

The output of the LSB decoder is shown as a submask (submask[0:q] in FIG. 2, where $p=2^{m+1}$). The output mask may be divided into sections of $2^{n-m+1}$ bits, and the submask may form the section of the output mask in which the transition from binary zero to binary one occurs in the output mask. Sections to the right of the transition section may be binary zeros (left shift) or binary ones (right shift). Sections to the left of the transition section may be binary ones (left shift) or binary zeros (right shift). The output of the MSB decoder may be viewed as section enables (SE[0:p] in FIG. 2, where $p=2^{m+1}$). Each section enable corresponds to one of the sections (e.g. SE[0] corresponds to the most significant section, which includes the most significant bit of the output mask, SE[1] corresponds to the next most significant section, and SE[p] corresponds to the least significant section, which includes the least significant bit of the output mask). If a section enable is asserted (binary one), the corresponding section either contains the submask or binary ones. If the section enable is deasserted (binary zero), the corresponding section contains binary zeros.

The final mask generator 32C is configured to generate the output mask responsive to the submask, the section enables, and the direction. The section enables have a transition between binary zero and binary one at the bit corresponding to the section in which the submask is to be inserted. That is, the bit corresponding to the submask section is a one, and an adjacent bit is a zero. However, which adjacent bit is a zero depends on the direction of the shift. If this shift is right, the adjacent bit to the left is the bit that identifies the submask section. If the shift is to the left, the adjacent bit to the right is the bit that identifies the submask section. The adjacent bit corresponds to a section that is adjacent to the submask section in the output mask.

In one embodiment, the final mask generator 32C may logically AND the submask with the section bit corresponding to a section, and logically OR the result with the adjacent section bit selected as described above. Viewed in another way, the submask may be replicated p+1 times, and the results mask may be logically ANDed with the section enables and logically ORed with the section enables right shifted (for a left shift) or left shifted (for a right shift) to generate the final mask.

Therefore, the submask section may be identified by selecting the correct adjacent bit responsive to the direction, and determining that the adjacent bit is zero and the bit corresponding to the section is a one. Based on the direction, the other sections are either binary zero or binary one.

In various embodiments, the number of bits in the input operand may vary. For example, in one embodiment, the number of bits may be 64 (r is 63). In such an embodiment, n is 5, m is 2, and p and q are both 7 (assuming equal division of the shift count into 3 MSBs and 3 LSBs). Other embodiments may have 32 bits in the input operand (r is 31), 128 bits (r is 127), or any other desired size. The count may have a number of bits permitting a shift/rotate amount of any size within the operand size. Thus, $2^{n+1}-1=r$.

It is noted that the mask generator 32 may also be used in other areas of a processor 10 besides the execution core 24, or in any type of integrated circuit. Furthermore, the rotator 30, mask generator 32, and circuitry 34 may be used anywhere that a shift/rotate operation may be needed. It is noted that, in one embodiment, the mask generator 32 may detect an "overshift" case in which the shift size is larger than the input operand. In such a case, the mask may be zeroed to provide a zero result. It is further noted that, in some embodiments, a shift operation may specify both a start bit and an end bit for a mask. In such a case, the start bit may be generated as a mask with Dir=0. A second mask may be generated using the end bit and Dir=1 (using a parallel mask generator). The two resulting masks may be logically ANDed to produce the desired mask.

Figure 3:
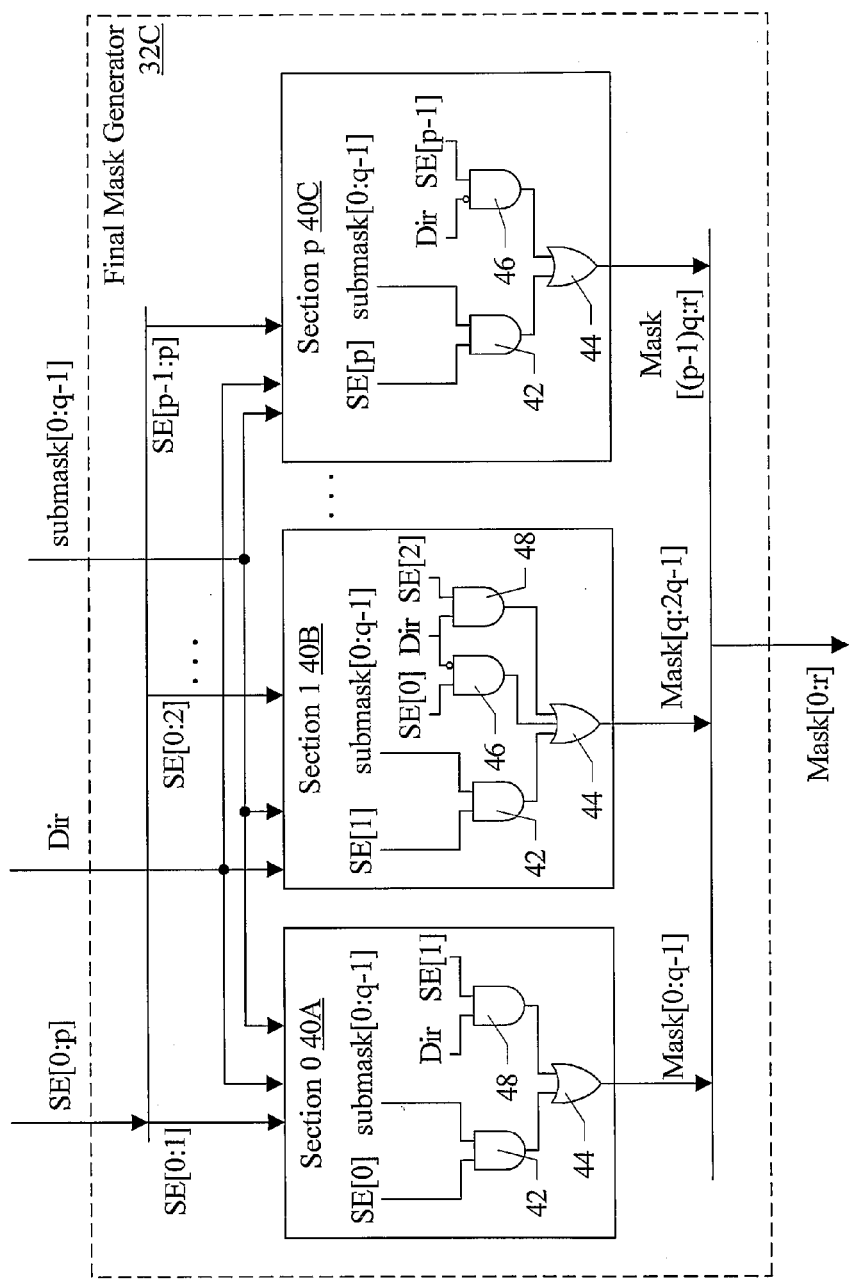
FIG. 3 is a block diagram of one embodiment of a final mask generator shown in FIG. 2.

Turning now to FIG. 3, a block diagram illustrating one embodiment of the final mask generator 32C is shown. In the illustrated embodiment, the final mask generator includes circuitry for each section of the output mask. For example, section 0 circuitry 40A corresponds to the most significant section of the output mask, section 1 circuitry 40B corresponds to the next most significant section of the output mask, and section p circuitry 40C corresponds to the least significant section of the output mask. Each section has q bits.

Section 1 circuitry 40B will be described first, as section circuitry 40A and 40C are special cases of the section 1 circuitry 40B. Other section circuitry between section 1 and section p may be similar to section 1 circuitry 40B. Section 1 circuitry 40B is coupled to receive the section enable for this section (SE[1]) along with the adjacent section enables (SE[0] and SE[2]). The section 1 circuitry logically ANDs each bit of the submask with SE[1] (represented by the AND gate 42 in FIG. 3), which results in the submask if the section enable is asserted and zero if the section enable is deasserted. The result is logically ORed with one of the adjacent bits (represented by the OR gate 44), selected according to the direction. More particularly, the direction indication in this embodiment is a logical one for a left shift and a logical zero for a right shift. Accordingly, the adjacent bit to the left (SE[0]) is selected if the direction is right (AND gate 46) and the adjacent bit to the right (SE[2]) is selected if the direction left (AND gate 48). If the section enable is a zero and the selected adjacent section enable bit is zero, the section output is all binary zeros. This output occurs if the section is part of the binary zeros portion of the output mask (the MSBs of the output mask for a right shift, or the LSBs of the output mask for a left shift). If the section enable is a one and the selected adjacent bit is zero, the section is the submask section and the submask is the result. If the selected adjacent bit is a one, the result is all binary ones for the section. This output occurs if the section is part of the binary ones portion of the output mask (the LSBs of the output mask for a left shift, or the MSBs of the output mask for a right shift).

More generally, a given section "s" may receive the corresponding section enable (SE[s]), the adjacent bit to the right (SE[s+1]), and the adjacent bit to the left (SE[s−1]). The SE[s+1] bit may be logically ANDed with the left shift indication (Dir), and the SE[s−1] bit may be logically ANDed with the right shift indication (the inverse of Dir). The results may be logically ORed with each bit of the bitwise logical AND of the SE[s] bit and the submask.

Section 0 circuitry 40A is similar, except that there is no adjacent bit to the left. Similarly, section p circuitry 40C is similar, except that there is no adjacent bit to the right. These non-existent adjacent bits may be assumed to be zero. Accordingly, AND gate 46 may be eliminated from section 0 circuitry 40A and AND gate 48 may be eliminated from section p circuitry 40C. Alternatively, the eliminated AND gates may be provided by may have one input tied to binary zero.

It is noted that, while various logic gates are shown in FIGS. 2 and 3, any logic circuitry may be used, including any Boolean equivalents of the logic illustrated and described above.

FIG. 4 is a truth table illustrating the output of the decoders 32A-32B for one embodiment in which the mask is 64 bits (and thus the shift count is 6 bits), and in which each decoder decodes 3 bits of the 6 (MSBs or LSBs). The direction input (1 for left, 0 for right) and the 3 input bits are shown, along with the output submask/section enables (labeled Out[0:7]).

Figure 5:
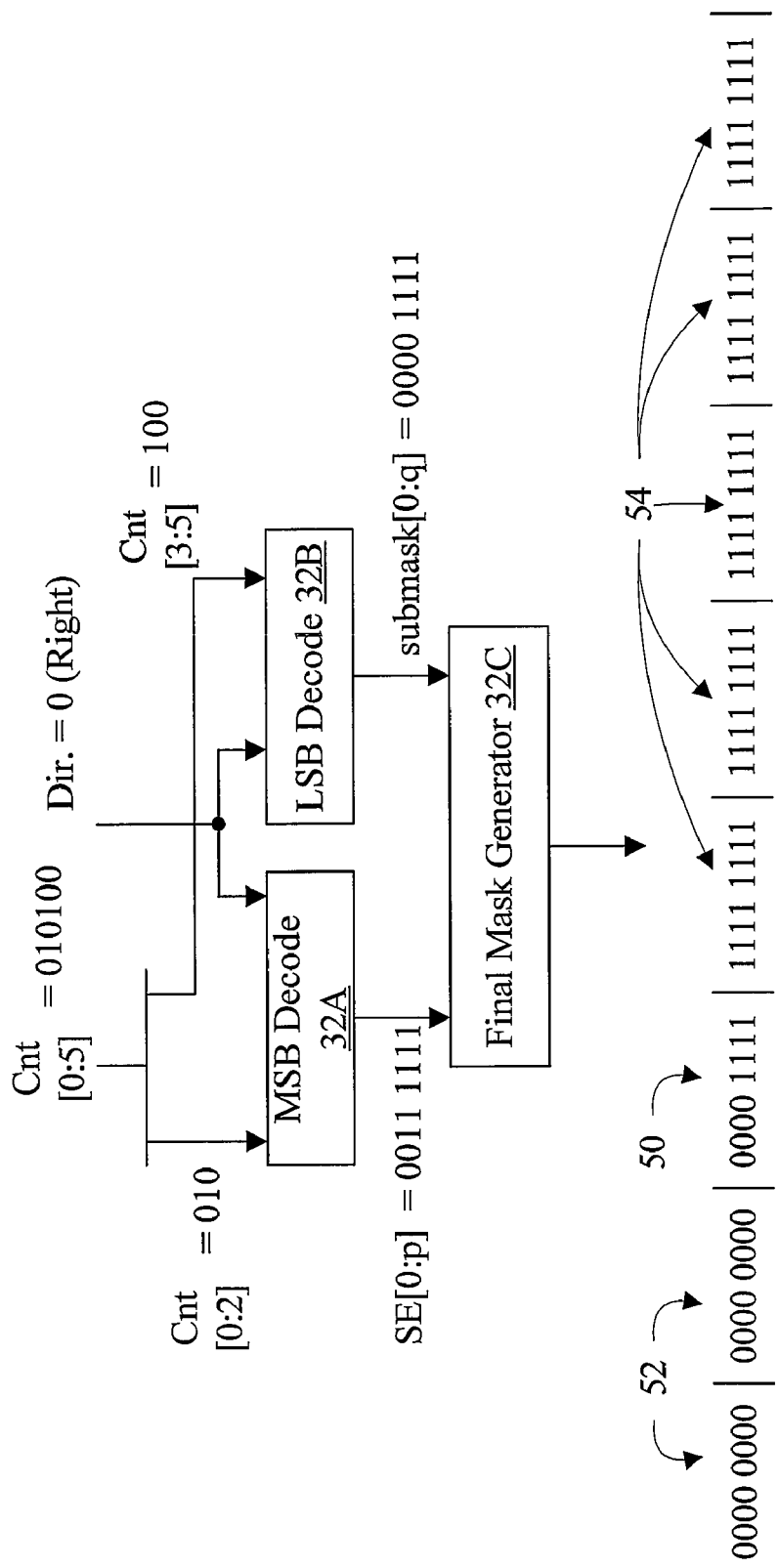
FIG. 5 is an example of one embodiment of the mask generator shown in FIG. 2.

FIG. 5 is an example using the truth table of FIG. 4, for a right shift with a shift count of 20 (010100 in binary). Accordingly, the three bits input to the MSB decoder 32A are 010 and the section enables are 0011 1111 (according to the truth table). The three bits input to the LSB decoder 32B are 100, and thus the submask is 0000 1111 (according to the truth table). The final mask generator 32C receives the submask, and generates the 64 bit output mask (shown at the bottom of FIG. 5 with vertical lines delimiting the 8 sections). The section circuitry for section 2 detects that SE[2] is set and the selected adjacent bit (SE[1]) is clear, so section 2 has the submask (reference numeral 50). Sections to the left (reference numeral 52) are all zeros since the section enable is clear and the selected adjacent bit is also clear. Sections to the right (reference numeral 54) are all ones since the selected adjacent bit is set.

Figure 6:
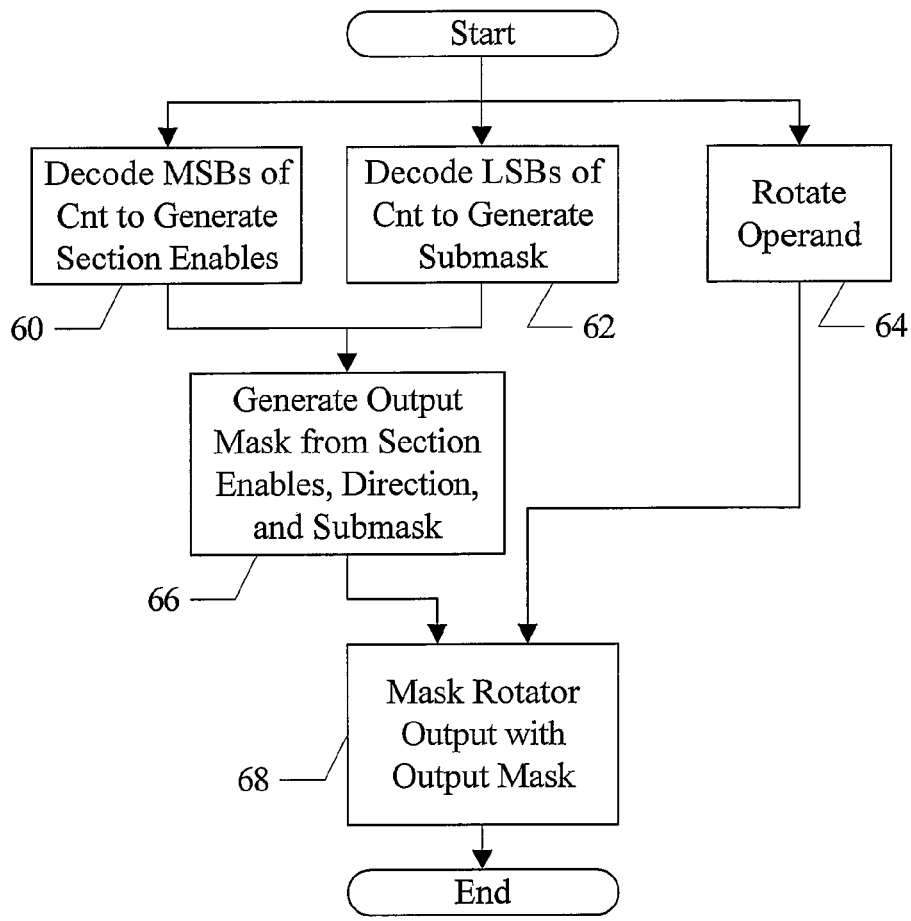
FIG. 6 is a flowchart illustrating operation of one embodiment of the execution core shown in FIG. 2.

FIG. 6 is a flowchart illustrating operation of one embodiment of the execution core 24 shown in FIG. 2 for one embodiment. While the blocks are shown in a particular order for ease of understanding, other orders may be used. Some blocks are shown as being performed in parallel, e.g. in combinatorial logic in the execution core 24 such as that shown in FIGS. 2 and 3. Other blocks may be performed in parallel as well. Blocks, combinations of blocks, and/or the flowchart of the whole may be pipelined over multiple clock cycles, as desired, although in one embodiment the flowchart of FIG. 6 operates in one clock cycle. The MSB decoder 32A may receive the MSBs of the shift count and the direction, and may decode them to generate the section enables (block 60). The LSB decoder 32B may receive the LSBs of the shift count and the direction, and may decode them to generate the submask (block 62). Additionally, the rotator 30 may receive the input operand and may rotate it by the shift count in the direction indicated by the direction input (block 64). The final mask generator 32C may receive the section enables, the direction, and the submask and may generate the mask output (block 66). The circuitry 34 may mask the rotator output with the output mask, forming the result (block 68).

As mentioned previously, in some embodiments, the rotator 30 is configured to perform a left rotate for a right rotate/shift operation without performing a two's complement operation on the count (which indicates the number of bits of right rotate or shift) to perform the rotate. A more rapid rotation may thus be realized, in some embodiments.

FIG. 7 is a table illustrating a portion of the right rotate/shift count (right cnt) and a corresponding (two's complemented) left count for a 6 bit count, to illustrate how the two's complement can be skipped. In the table, the most significant 3 bits and the least significant 3 bits are divided by a space for both the right and left counts. Comparing the least significant 3 bits of each count, the LSBs of the left count are the two's complement of the LSBs of the corresponding left count. Comparing the most significant 3 bits of each count, the MSBs of the left count are the one's complement (inverse) of the MSBs of the right count except when the LSBs are zero.

Figure 8:
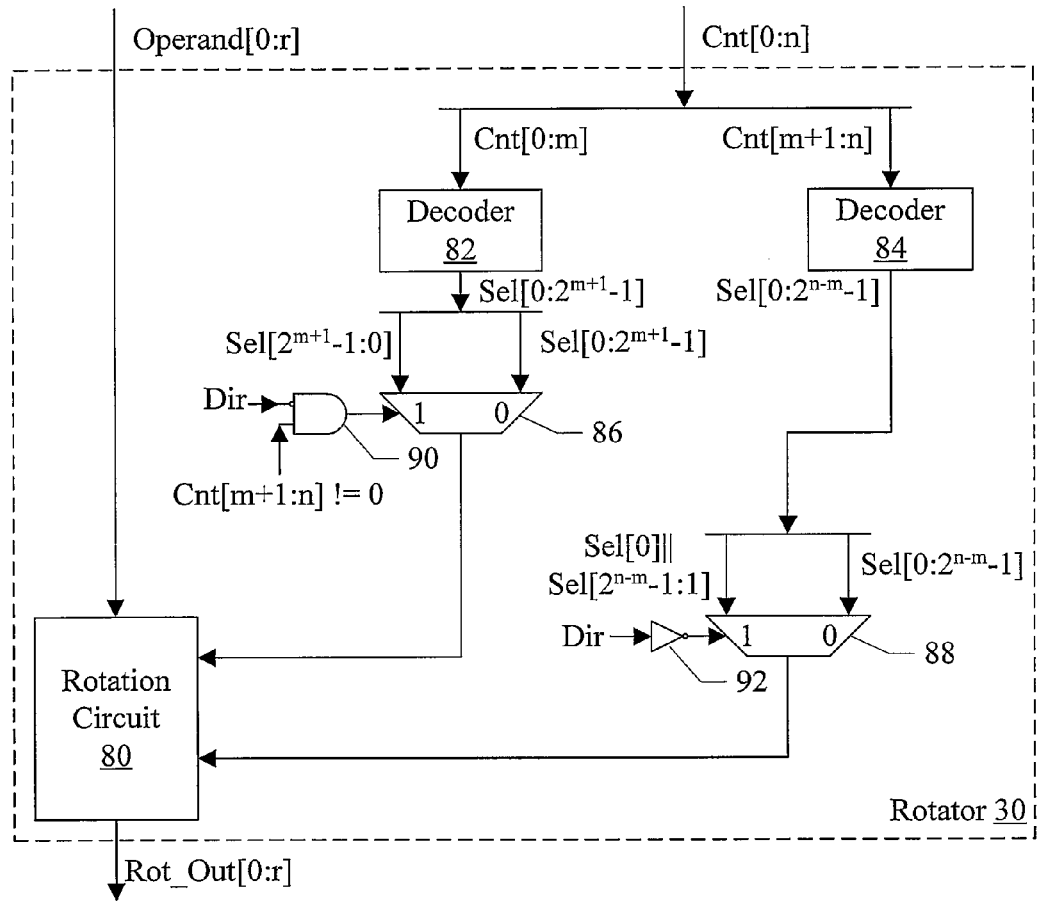
FIG. 8 is a block diagram illustrating one embodiment of a rotator in more detail.

Turning next to FIG. 8, a block diagram of one embodiment of the rotator 30 is shown. In the illustrated embodiment, the rotator 30 includes a rotation circuit 80, decoders 82 and 84, muxes 86 and 88, and mux selection circuits 92 and 94. The rotation circuit 80 is coupled to receive the operand to be rotated/shifted (Operand[0:r]) and is coupled to provide a rotation output (Rot_Out[0:r]). The rotation circuit 80 is also coupled to receive the outputs of the muxes 86 and 88 as rotation controls. The muxes 86 and 88 are coupled to receive the outputs of the decoders 82 and 84, respectively. Specifically, the mux 86 is coupled to receive the output of the decoder 82 in order from most significant to least significant (on the 0 input) and least significant to most significant (on the 1 input). The mux 88 is coupled to receive the output of the decoder 84 in order from most significant to least significant (on the 0 input). Additionally, the mux 88 receives the most significant bit of the output of the decoder 84, concatenated with the remaining bits in order from least significant to most significant. The decoders 82 and 84 are coupled to receive most significant bits and least significant bits of the count input.

In one embodiment, the rotation circuit 80 may be configured to rotate the input operand on a byte granularity in a first level of muxing, controlled by the output of the decoder 82, and then rotate the rotated by bytes at a bit level of granularity in a second level of muxing, controlled by the output of the decoder 84. In such an embodiment, m would be equal to n−3. Other embodiments may divide the shift/rotate operation at different points, and would use different divisions of the count input.

Each decoder 82 and 84 decodes its input bits and outputs a set of selects. One select in the set may be asserted, based on the value of the input count. For a left rotate/shift (Dir=1, in this embodiment), the count input is the correct count, and the selects in the order output from the decoders 82 and 84 are selected (input 0 of each mux 86 and 88). On the other hand, if the operation is a right shift/rotate, the input count is not the correct count to perform a left shift. However, for the most significant bits decoded by the decoder 82, the count is the one's complement of the correct count unless the LSBs decoded by the decoder 84 are zero (as illustrated in the table of FIG. 7). Accordingly, if the LSBs of the count are not equal to zero, the decoder output in the reverse order is selected. The AND gate 90 may detect that the direction is right (Dir=0) and the LSBs are not equal to zero. If the LSBs of the count are equal to zero, then the MSBs of the count are equal to the corresponding left shift MSBs, and input 0 of the mux 86 may be selected. For the LSBs, the correct count is the two's complement of the input count. Accordingly, for a right shift (Dir=0, detected by the inverter 92) is selected.

Numerous variations and modifications will become apparent to those skilled in the art once the above disclosure is fully appreciated. It is intended that the following claims be interpreted to embrace all such variations and modifications.

What is claimed is:

1. An apparatus configured to perform a shift operation on an input operand, wherein a size of the shift operation is specified by a shift count and a direction of the shift operation is specified by a shift direction, the apparatus comprising:
a rotator coupled to receive the input operand and the shift count, wherein the rotator is configured to rotate the input operand by the shift count, outputting a rotated operand;
a mask generator coupled to receive the shift count and the shift direction and configured to generate an output mask comprising a plurality of bits equal in number to that of the input operand, wherein the output mask is divided into a plurality of sections where each section of the output mask is the same size as each other section of the output mask, wherein the mask generator is configured to decode a most significant bit (MSB) field of the shift count to generate a first mask comprising a number of bits equal to the number of sections in the output mask, and wherein the mask generator is configured to decode a least significant bit (LSB) field of the shift count to generate a second mask comprising a number of bits equal to the size of a section in the output mask and identifying the bits in a transition section where a transition from binary ones to binary zeros occurs in the output mask, and wherein each bit of the first mask is a section enable determining the assertion or deassertion of bits in the corresponding section of the output mask, and wherein the mask generator is configured to generate each section of the output mask by logically ANDing each of the bits of the second mask with the corresponding bit of the first mask and logically ORing the result with an adjacent bit of the first mask, wherein the mask generator is configured to select the adjacent bit responsive to the shift direction; and
circuitry configured to mask the rotated operand with the output mask.

2. The apparatus as recited in claim 1 wherein the mask generator is configured to select the adjacent bit to the left if the shift direction is to the right, and wherein the mask generator is configured to select the adjacent bit to the right if the shift direction is to the left.

3. The apparatus as recited in claim 2 wherein, for a most significant section of the output mask, the adjacent bit to the left is assumed to be zero.

4. The apparatus as recited in claim 2 wherein, for a least significant section of the output mask, the adjacent bit to the right is assumed to be zero.

5. The apparatus as recited in claim 1 wherein the circuitry is configured to override the output mask for a rotate operation, wherein the rotated operand is output as a result.

6. The apparatus as recited in claim 5 wherein the circuitry is configured to logically OR bits of the output mask with an indication of the rotate operation, whereby the output mask is all ones for the rotate operation.

7. The apparatus as recited in claim 1 wherein the mask generator is implemented with static logic circuitry.

8. A mask generator comprising:

a first decoder circuit coupled to receive a most significant bit (MSB) field of a shift count and a shift direction corresponding to a shift operation, wherein the first decoder circuit is configured to decode the MSB field and the shift direction to generate a first mask comprising a number of bits equal to a number of sections in an output mask, wherein each bit of the first mask is a section enable determining the assertion or deassertion of bits in the corresponding section of the output mask of the mask generator, and wherein each section of the output mask comprises a plurality of bits and each section of the output mask is a same size as each other section of the output mask;

a second decoder circuit coupled to receive a least significant bit (LSB) field of the shift count and the shift direction, wherein the second decoder circuit is configured to decode the LSB field and the shift direction to generate a second mask comprising a number of bits equal to the size of a section in the output mask and identifying the bits in a transition section where a transition from binary ones to binary zeros occurs in the output mask; and a final mask generator circuit coupled to the first decoder circuit and the second decoder circuit and to receive the shift direction, wherein the final mask generator circuit is configured to generate each section of the output mask by logically ANDing each of the bits of the second mask with the corresponding bit of the first mask and logically ORing the result with an adjacent bit of the first mask, wherein the final mask generator circuit is configured to select the adjacent bit responsive to the shift direction.

9. The mask generator as recited in claim 8 wherein the final mask generator circuit is configured to select the adjacent bit to the left if the shift direction is to the right, and wherein the final mask generator circuit is configured to select the adjacent bit to the right if the shift direction is to the left.

10. The mask generator as recited in claim 9 wherein, for a most significant section of the output mask, the adjacent bit to the left is assumed to be zero.

11. The mask generator as recited in claim 9 wherein, for a least significant section of the output mask, the adjacent bit to the right is assumed to be zero.

12. The mask generator as recited in claim 8 wherein the first decoder circuit, the second decoder circuit, and the final mask generator circuit are implemented with static logic circuitry.

13. A method comprising:

receiving a shift count and a shift direction of a shift operation in an execution core of a processor;

decoding a most significant bit (MSB) field of the shift count and the shift direction to generate a first mask in a first decoder circuit comprising a number of bits equal to a number of sections in an output mask, wherein each bit of the first mask is a section enable determining the assertion or deassertion of bits in the corresponding section of the output mask, and wherein each section of the output mask comprises a plurality of bits and each section of the output mask is a same size as each other section of the output mask;

decoding a least significant bit (LSB) field of the shift count and the shift direction to generate a second mask in a second decoder circuit comprising a number of bits equal to the size of a section in the output mask and identifying the bits in a transition section where a transition from binary ones to binary zeros occurs in the output mask; and generating each section of the output mask by logically ANDing each of the bits of the second mask with the corresponding bit of the first mask and logically ORing the result with an adjacent bit of the first mask, wherein the final mask generator circuit is configured to select the adjacent bit responsive to the shift direction, the generating performed in a mask generator circuit.

14. The method as recited in claim 13 further comprising:

receiving an input operand of the shift operation;

rotating the input operand by the shift count, forming a rotated operand; and masking the rotated operand with the output mask.

15. The method as recited in claim 14 further comprising overriding the output mask for a rotate operation, wherein the rotated operand is output as a result.

16. The method as recited in claim 15 wherein the overriding comprises logically ORing bits of the output mask with an indication of the rotate operation, whereby the output mask is all ones for the rotate operation.

17. The method as recited in claim 13 wherein the adjacent bit is to the left if the shift direction is to the right, and wherein the adjacent bit is to the right if the shift direction is to the left.

18. The method as recited in claim 17 wherein, for a most significant section of the output mask, the adjacent bit to the left is assumed to be zero.

19. The method as recited in claim 17 wherein, for a least significant section of the output mask, the adjacent bit to the right is assumed to be zero.

* * * * *